US 12,243,292 B2

(12) United States Patent
Cheng et al.

(10) Patent No.: US 12,243,292 B2
(45) Date of Patent: Mar. 4, 2025

(54) SYSTEMS FOR MULTI-TASK JOINT TRAINING OF NEURAL NETWORKS USING MULTI-LABEL DATASETS

(71) Applicant: Lemon Inc., Grand Cayman (KY)

(72) Inventors: Shuo Cheng, Los Angeles, CA (US); Wanchun Ma, Los Angeles, CA (US); Linjie Luo, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 363 days.

(21) Appl. No.: 17/929,449

(22) Filed: Sep. 2, 2022

(65) Prior Publication Data
US 2024/0078792 A1 Mar. 7, 2024

(51) Int. Cl.
G06K 9/62 (2022.01)
G06N 3/0455 (2023.01)
G06N 3/09 (2023.01)
G06V 10/44 (2022.01)
G06V 10/764 (2022.01)
G06V 10/766 (2022.01)
G06V 10/774 (2022.01)
(Continued)

(52) U.S. Cl.
CPC ......... *G06V 10/774* (2022.01); *G06N 3/0455* (2023.01); *G06N 3/09* (2023.01); *G06V 10/454* (2022.01); *G06V 10/764* (2022.01); *G06V 10/766* (2022.01); *G06V 10/776* (2022.01); *G06V 10/778* (2022.01); *G06V 10/82* (2022.01); *G06V 10/96* (2022.01); *G06V 40/171* (2022.01); *G06V 40/174* (2022.01)

(58) Field of Classification Search
None
See application file for complete search history.

(56) References Cited

U.S. PATENT DOCUMENTS 10,776,712 B2 * 9/2020 Oono .................... G06N 3/084
11,526,713 B2 * 12/2022 Anderson ............ G06F 18/214
(Continued)

OTHER PUBLICATIONS

Wadhawan et al., "Landmark-Aware and Part-Based Ensemble Transfer Learning Network for Static Facial Expression Recognition from Images," in IEEE Transactions on Artificial Intelligence, vol. 4, No. 2, pp. 349-361, Apr. 2023 (publication date: May 3, 2022). ( Year: 2022).*
(Continued)

Primary Examiner — Feng Niu
(74) Attorney, Agent, or Firm — Alleman Hall & Tuttle LLP

(57) ABSTRACT

Systems and methods for multi-task joint training of a neural network including an encoder module and a multi-headed attention mechanism are provided. In one aspect, the system includes a processor configured to receive input data including a first set of labels and a second set of labels. Using the encoder module, features are extracted from the input data. Using a multi-headed attention mechanism, training loss metrics are computed. A first training loss metric is computed using the extracted features and the first set of labels, and a second training loss metric is computed using the extracted features and the second set of labels. A first mask is applied to filter the first training loss metric, and a second mask is applied to filter the second training loss metric. A final training loss metric is computed based on the filtered first and second training loss metrics.

20 Claims, 9 Drawing Sheets

(51) Int. Cl.
*G06V 10/776* (2022.01)
*G06V 10/778* (2022.01)
*G06V 10/82* (2022.01)
*G06V 10/96* (2022.01)
*G06V 40/16* (2022.01)

(56) References Cited

U.S. PATENT DOCUMENTS

| | | | | |
|---|---|---|---|---|
| 11,798,171 | B2* | 10/2023 | Shim | G06V 10/82 |
| 11,823,375 | B2* | 11/2023 | Keshwani | G06N 20/00 |
| 2017/0161635 | A1* | 6/2017 | Oono | G06N 3/082 |
| 2019/0042894 | A1* | 2/2019 | Anderson | G06N 20/00 |
| 2019/0108447 | A1* | 4/2019 | Kounavis | G06V 10/82 |
| 2022/0156587 | A1* | 5/2022 | Ebrahimpour | G06N 3/08 |
| 2023/0093619 | A1* | 3/2023 | Shim | G06V 10/82 382/173 |
| 2023/0101539 | A1* | 3/2023 | Liu | G16H 50/70 702/19 |
| 2023/0134348 | A1* | 5/2023 | Chaudhary | G06N 5/022 706/12 |
| 2023/0360208 | A1* | 11/2023 | Ianni | G06V 20/70 |
| 2024/0289990 | A1* | 8/2024 | Niebles | G06V 10/88 |

OTHER PUBLICATIONS

Berg et al., "Deep Ordinal Regression with Label Diversity," 2020 25th International Conference on Pattern Recognition (ICPR), Milan, Italy, 2021, pp. 2740-2747, doi: 10.1109/ICPR48806.2021.9412608. (Year: 2021).*

Jacob et al., "Facial Action Unit Detection With Transformers," 2021 IEEE/CVF Conference on Computer Vision and Pattern Recognition (CVPR), Nashville, TN, USA, 2021, pp. 7676-7685, doi: 10.1109/CVPR46437.2021.00759. (Year: 2021).*

Song et al., "Learning from noisy labels with deep neural networks: A survey." IEEE transactions on neural networks and learning systems 34, No. 11 (2022): 8135-8153. (Year: 2022).*

Tharmakulasingam et al., "Explainable Deep Learning Approach for Multilabel Classification of Antimicrobial Resistance With Missing Labels, " in IEEE Access, vol. 10, pp. 113073-113085, 2022 (Year: 2022).*

* cited by examiner

FIG. 7A

| | Blink Eyes | Roll Eyes | Wide Eyes | Mouth | Pucker | Lips | Jaw | Eyebrows | Cheeks | Nose |
|---|---|---|---|---|---|---|---|---|---|---|
| Baseline | 0.06 | 0.11 | 0.13 | 0.06 | 0.08 | 0.05 | 0.05 | 0.11 | 0.07 | 0.05 |
| Multi-Task | 0.05 | 0.09 | 0.09 | 0.06 | 0.07 | 0.05 | 0.04 | 0.1 | 0.06 | 0.04 |

FIG. 7B

| | Tongue | Happy | Sad | Surprise | Disgust | Fear | Anger | Speech_1 | Speech_2 | Speech_3 |
|---|---|---|---|---|---|---|---|---|---|---|
| Baseline | 0.06 | 0.05 | 0.05 | 0.1 | 0.07 | 0.12 | 0.08 | 0.05 | 0.06 | 0.06 |
| Multi-Task | 0.05 | 0.04 | 0.05 | 0.09 | 0.05 | 0.1 | 0.08 | 0.04 | 0.05 | 0.04 |

SYSTEMS FOR MULTI-TASK JOINT TRAINING OF NEURAL NETWORKS USING MULTI-LABEL DATASETS

BACKGROUND

Machine learning is a developing field of study in which models are trained to perform inference tasks based on training data, using training algorithms. One type of machine learning model is a neural network. Neural networks have been applied to perform various inference tasks in fields such as computer vision, natural language processing (NLP), etc. Neural networks include layers of nodes connected by weighted connections. The layers may be configured to perform different functions, such as convolution, pooling, deep learning, classification, and regression. The layers are configured by adjusting the connection topology and activation functions of the nodes. In this way, the layers of nodes in the neural network may be formed into functional building blocks, and those functional building blocks may be arranged into different neural network architectures, to accomplish different training and inference tasks. These architectures can be grouped into different network types, and for each network type a variety of specific architectures can be generated. Common neural network types include convolutional neural networks (CNNs), recurrent neural networks (RNNs), bi-directional long short term memory (LSTM) RNNs, encoder-decoder transformers, encoder-only transformers, Siamese networks, etc. A neural network is trained at training time based on a training dataset, and the weights of the connections are adjusted using an algorithm such as backpropagation. At inference time, the trained neural network is configured to receive an inference time input and produce an inference time output in response. If the inference time input is similar to the training time inputs, the trained neural network generally will perform a more accurate prediction at inference time.

SUMMARY

Systems and methods for multi-task joint training of a neural network including an encoder module and a multi-headed attention mechanism are provided. In one aspect, the system includes a processor configured to receive input data including a first set of labels and a second set of labels. Using the encoder module, features are extracted from the input data. Using a multi-headed attention mechanism, training loss metrics are computed. Using a first task head of the multi-headed attention mechanism, a first training loss metric is computed using the extracted features and the first set of labels. Using a second task head of the multi-headed attention mechanism, a second training loss metric is computed using the extracted features and the second set of labels. A first mask is applied to filter the first training loss metric, and a second mask is applied to filter the second training loss metric. The first mask is computed based on the first set of labels, and the second mask is computed based on the second set of labels. A final training loss metric is computed based on the filtered first and second training loss metrics.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A and 7B are charts comparing L1 losses for a multi-task joint trained neural network and a baseline model for facial expression capturing classification tasks, illustrating results obtained by the example system of FIG. 1.

DETAILED DESCRIPTION

Figure 1:
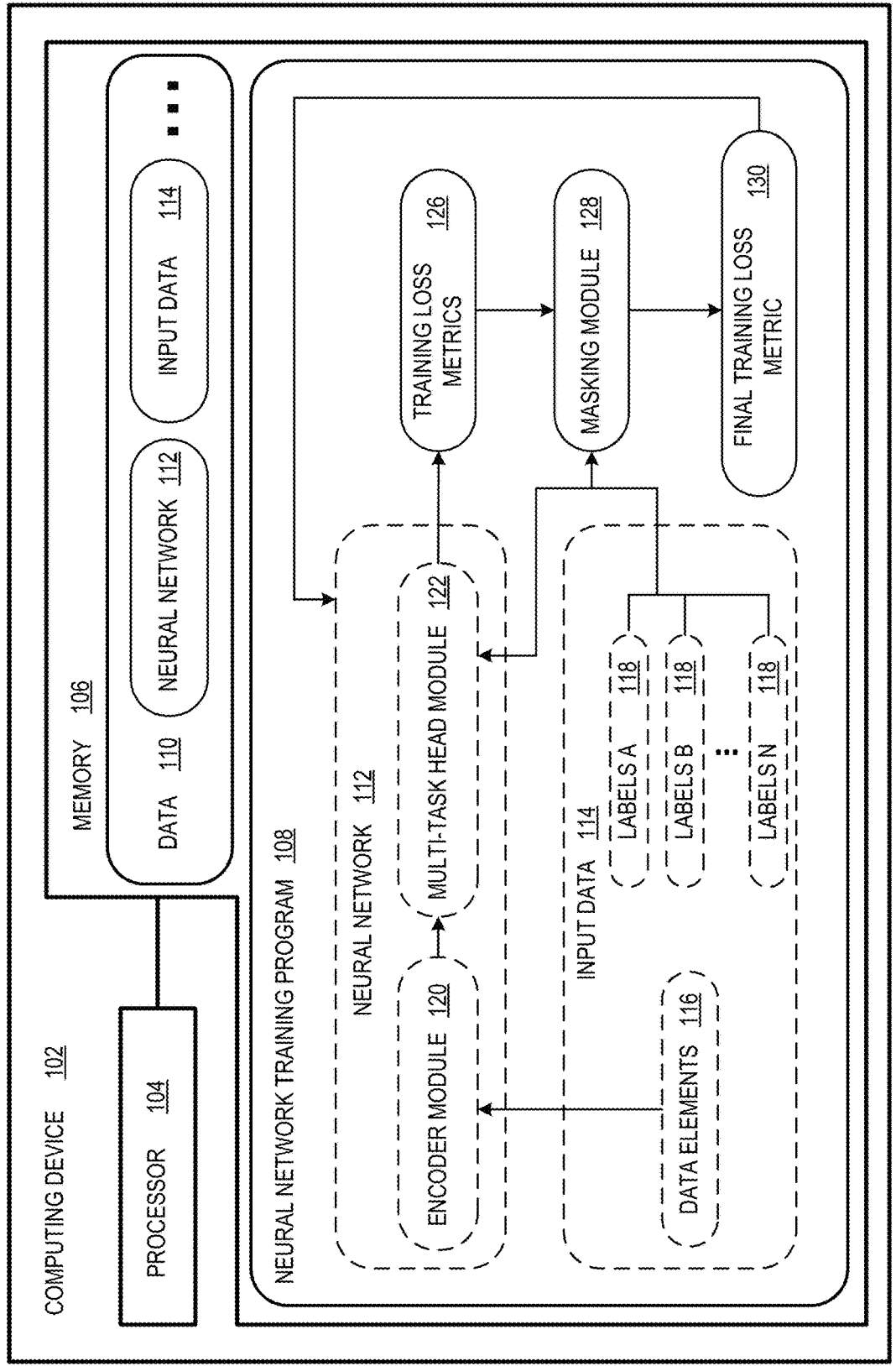
FIG. 1 is a schematic view of an example computing system configured to perform multi-task joint training of neural networks in accordance with an implementation of the present disclosure.

The generalization and accuracy of trained neural networks are important characteristics that are highly analyzed in determining the effectiveness of a machine learning training process. These characteristics generally depend on several different factors in the training process. For example, for certain tasks such as facial image classification, the generalization and accuracy of the trained neural network can depend on the distribution of the training dataset. A diverse training dataset covering different situations (e.g., lighting, identity, expression, pose, etc. for facial image classification tasks) can boost the performance of the learned neural network models. Training datasets can also be diversified through aggregation of different sources. However, introducing more diversity can increase the complexity requirements of the training process. For example, in one type of deep learning application, image classification, machine learning models can be trained to predict a classification of an object shown in an image based on training datasets that include thousands of images labeled with a single label (e.g., CIFAR-10 dataset, MNIST dataset, etc.). The CIFAR-10 dataset labels each image with one of 10 labels for objects such airplane, car, etc. The MNIST dataset includes images of handwritten digits and labels that classify each image into its associated value from 0-9.

A challenge exists in leveraging existing datasets to train machine learning models to predict multiple classifications. For example, it would be difficult to combine existing datasets having different images and different classifications into a single labeled dataset because of the extensive time and cost needed to add additional ground truth labeling, and because of the potential lack of standardization between the formatting of the input images. Without such effort, accuracy of the model could potentially suffer.

In view of the observations above, systems and methods in accordance with various implementations of the present disclosure are presented for multi-task joint training of neural networks. In many implementations, a multi-task joint training framework is implemented with a multi-headed attention mechanism and an encoder module. The multi-headed attention mechanism can include a plurality of task heads, which enable the use of a diverse training dataset. Diversity in training datasets can involve various aspects. For example, the training dataset can include data from mixed sources. The training dataset can include a multi-label dataset having a plurality of sets of labels. In further implementations, the multi-label dataset is annotated with heterogeneous labels. In some implementations, the multi-task joint training framework utilizes a mask-based mechanism that allows flexibly handling of heterogeneous labels with missing annotations. Further, the framework can utilize the multi-headed attention mechanism to enable joint learning on multiple inference tasks. The multi-headed attention mechanism can include task heads configured to perform different types of inference tasks, which can include task categories such as classification, regression, clustering, ranking, detection, recommendation, etc.

Depending on the specific application, using multiple types of task heads can have a synergistic effect. For example, different inference tasks directed towards facial data can include commonalities between or among the inference tasks. In some implementations, a first task head can be implemented to perform a facial expression capturing task, and a second task head can be implemented to perform a facial landmark regression task. Both inference tasks can utilize facial image data as inputs. Even with datasets from mixed sources, there exists cohesion between the inference tasks that allow for a more efficient training process compared to single-label classification neural network training processes. These and other implementations are discussed below in further detail.

FIG. 1 is a schematic view of an example computing system 100 configured to perform multi-task joint training of neural networks in accordance with an implementation of the present disclosure. As shown, the computing system 100 includes a computing device 102 that further includes a processor 104 (e.g., central processing units, or "CPUs") and memory 106 (e.g., volatile and non-volatile memory) operatively coupled to each other. The memory 106 stores the neural network training program 108, which contains instructions for the various software modules described herein for execution by the processor 104. The memory 106 also stores data 110 for use by the neural network training program 108 and its software modules.

Upon execution by the processor 104, the instructions stored in the neural network training program 108 cause the processor 104 to initialize the training process, which includes retrieving a neural network 112 and input data 114 from the data 110 stored in memory 106. Depending on the application, the input data 114 can include different datasets and data structures. For example, in the depicted system 100, the input data 114 includes a multi-label training dataset, which includes data elements 116 and a plurality of sets of labels 118. Different types and formats of data elements 116 can be utilized. For example, the data elements 116 can be image data, which can be used for image-related inference tasks. Other types of data elements include audio data, natural language processing data, graph data, etc. For a multi-label training dataset, each set of labels in the plurality of sets of labels 118 can provide annotations indicating relevant associations of the data elements 116 for a certain task. For example, a set of labels can include annotations associating the data elements 116 with different image classifications, which can be used for classification tasks such as object detection, facial recognition, etc. Labels with annotations for other inference tasks such as regression, clustering, ranking, detection, recommendation, etc. can also be utilized.

Figure 6:
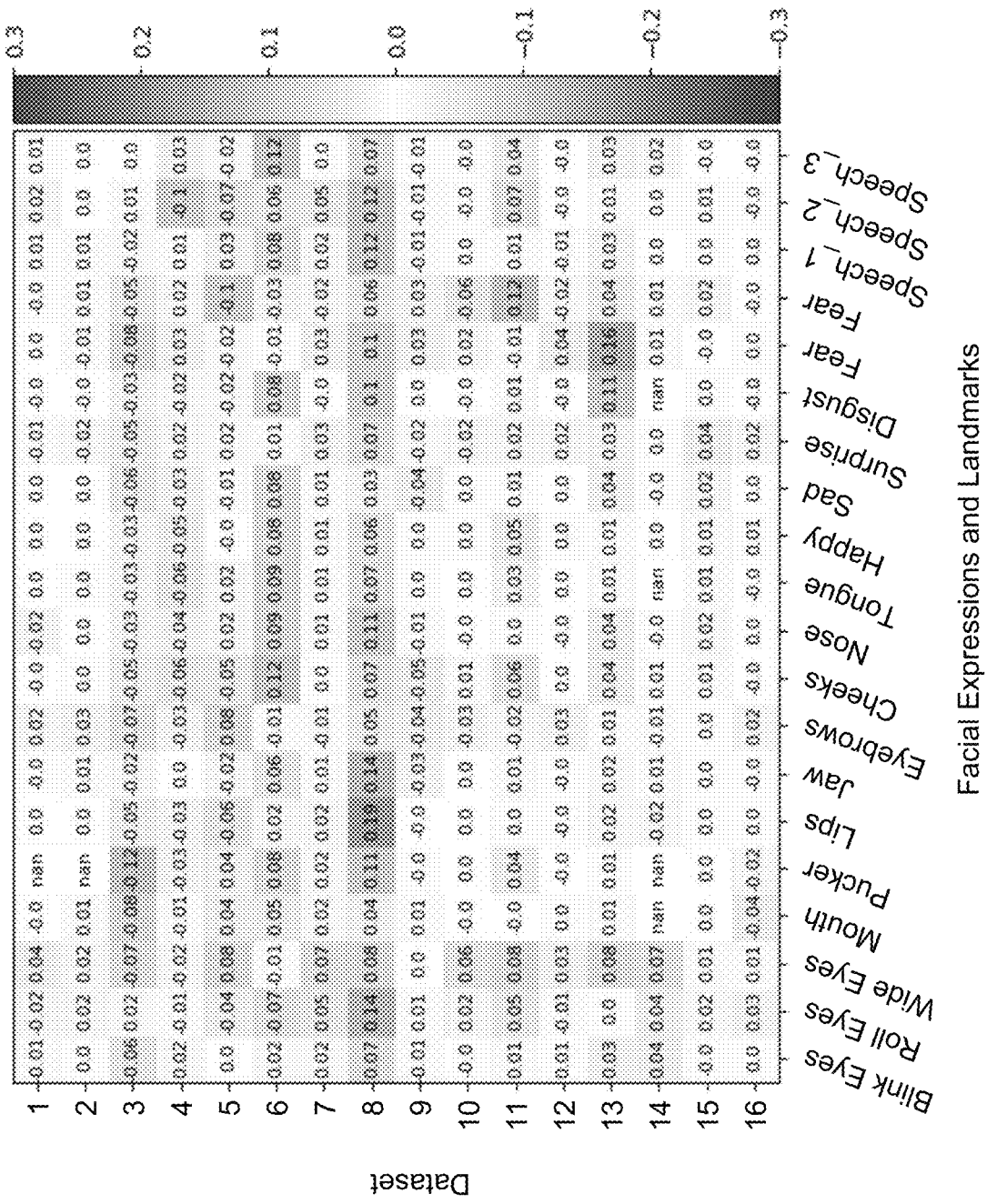
FIG. 6 is a chart showing error reduction values for a trained multi-task neural network compared to a baseline model for facial expression capturing classification tasks, illustrating results obtained by the example system of FIG. 1.

The retrieved neural network 112 can include different neural network architectures. In the depicted system 100, the neural network 112 includes an encoder module 120 and a multi-task head module 122. Using the encoder module 120, features can be extracted from the data elements 116. The multi-task head module 122 can then output predictions for inference tasks based on the extracted features and a related set of labels 118. The multi-task head module 122 can be implemented using various different neural network architectures. For example, the multi-task head module 122 can include a plurality of task heads, each implemented for an inference task. In many implementations, at least one task head includes a neural network of fully-connected layers. In some implementations, the plurality of task heads includes at least one task head for a classification task and at least one task head for a regression task. In further implementations, the multi-task head module 122 includes a first task head for a facial expression capturing classification task and a second task head for a facial landmark regression task. Additional task heads can be implemented as appropriate depending on the application. Examples of expression classifications are illustrated in FIG. 6 and include blinking eyes, rolling eyes, wide eyes, pucker, happy, sad, sad, disgust, fear, mouth forming first speech element (e.g., "F" sound), mouth forming second speech element (e.g., "M" sound), mouth forming third speech element (e.g., "S" sound). These are merely exemplary and numerous other facial expression classifications are also possible. Examples of landmark classifications are also illustrated in FIG. 6 and include mouth, lips, jaw, eyebrows, cheeks, nose, and tongue. These are merely exemplary and numerous other facial landmark classifications are also possible. Each landmark, it will be appreciated, may have associated image coordinates (X, Y) marking a reference point, such a centroid or origin, of the identified landmark in the image. Returning to FIG. 1, the multi-task head module 122 can be implemented with varying numbers of task heads for different inference tasks, such as classification, regression, clustering, ranking, detection, recommendation, etc.

By comparing the output predictions with the corresponding set of labels 118, the multi-task head module 122 can compute a training loss metric 126. For example, a first task head of the multi-task head module 122 can compute a first set of training loss metrics 126 for the data elements 116 using a first set of labels. A second task head of the multi-task head module 122 can compute a second set of training loss metrics 126 for the data elements 116 using a second set of labels. A training loss is a metric that indicates the accuracy of the prediction compared to a ground truth value. If the prediction is perfect, the loss is zero. Greater losses indicate worse performances. Different functions may be used to calculate the training loss metric. For example, an L1 loss function calculates the loss by summing the absolute differences between the true values and the predicted values. An L2 loss function calculates the loss by summing all the squared differences between the true values and the predicted values. Various other loss functions, such as a smooth L1 loss function, may also be implemented.

In some implementations, the sets of labels 118 include incomplete annotations. Incomplete annotations can be a consequence of utilizing diverse datasets from mixed sources. Data elements 116 with missing annotations for a given task will likely have a larger training loss compared to annotated data elements. Such training losses resulting from data elements 116 with missing annotations provide little information on the performance of the respective task head and, as such, do not efficiently contribute to the training of the neural network. To accommodate missing annotations, a masking module 128 can be implemented to filter the training loss metrics 126 based on the missing annotations in the sets of labels 118. In many implementations, the sets of labels 118 include random values for missing annotations. In some implementations, the sets of labels 118 are zero-padded, having values of zeroes for missing annotations. The masking module 128 computes a mask for each set of labels based on the missing annotations. The mask can be computed and formatted in a number of different ways. In some implementations, the mask is a binary mask having zero values that represents the missing annotations. The mask can be used to filter a related set of training loss metrics 126 to compensate for the effects of missing annotations. For example, a first mask can be computed based on a first set of labels, and a second mask can be computed based on a second set of labels. The first mask can be used to filter out training losses associated with missing annotations from the first set of labels, and the second mask can be used to filter out training losses associated with missing annotations from the second set of labels. Based on the filtered training losses, a final training loss metric 130 can be computed. The neural network 112 can then be updated and adjusted using the final training loss metric 130. This training process can continue iteratively or until a desired convergence.

Figure 2:
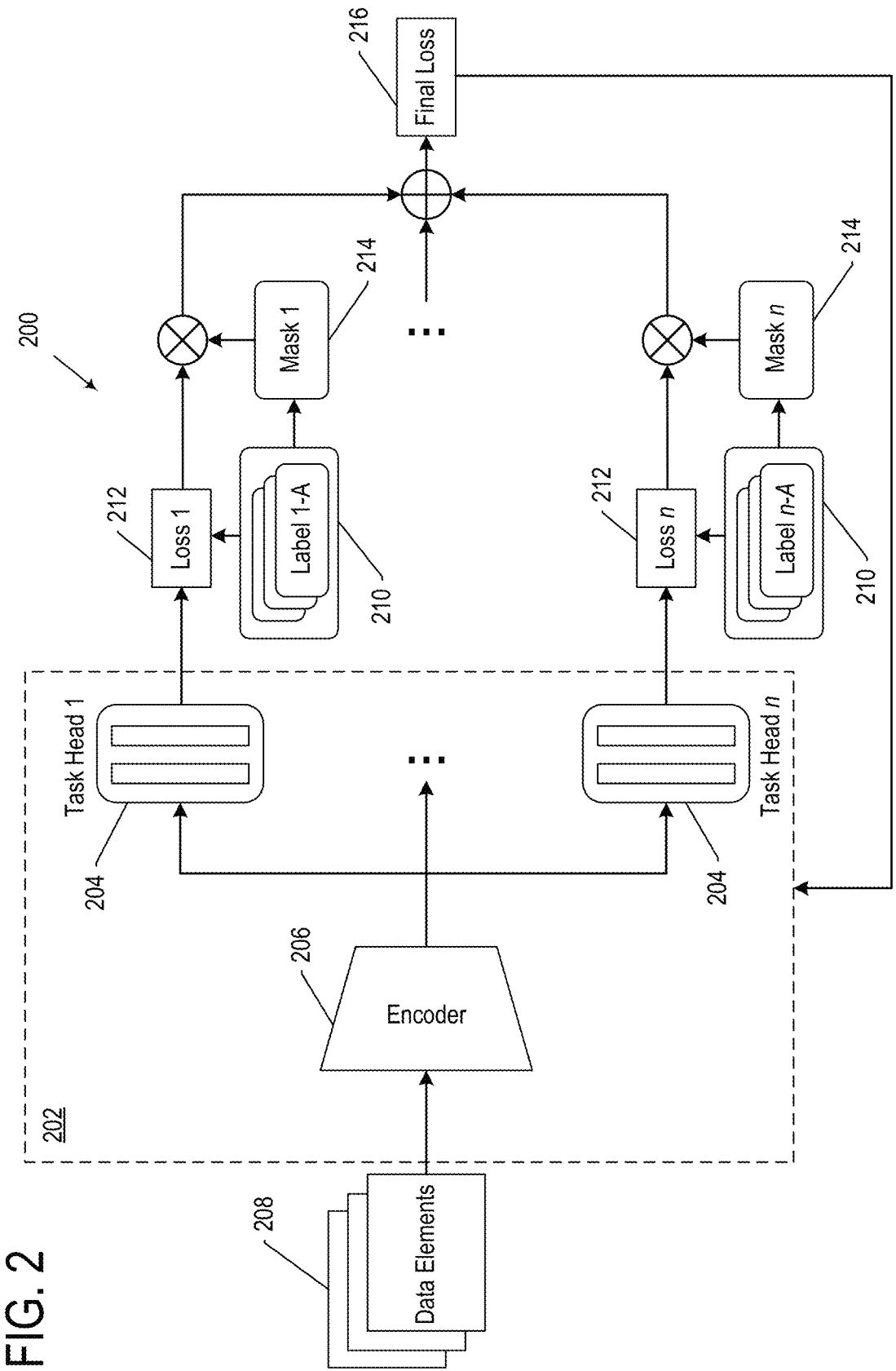
FIG. 2 is a diagram conceptually illustrating an example configurable framework for multi-task joint training of neural networks utilizing a shared encoder in accordance with an implementation of the present disclosure, which can be implemented by the system of FIG. 1.
Figure 3:
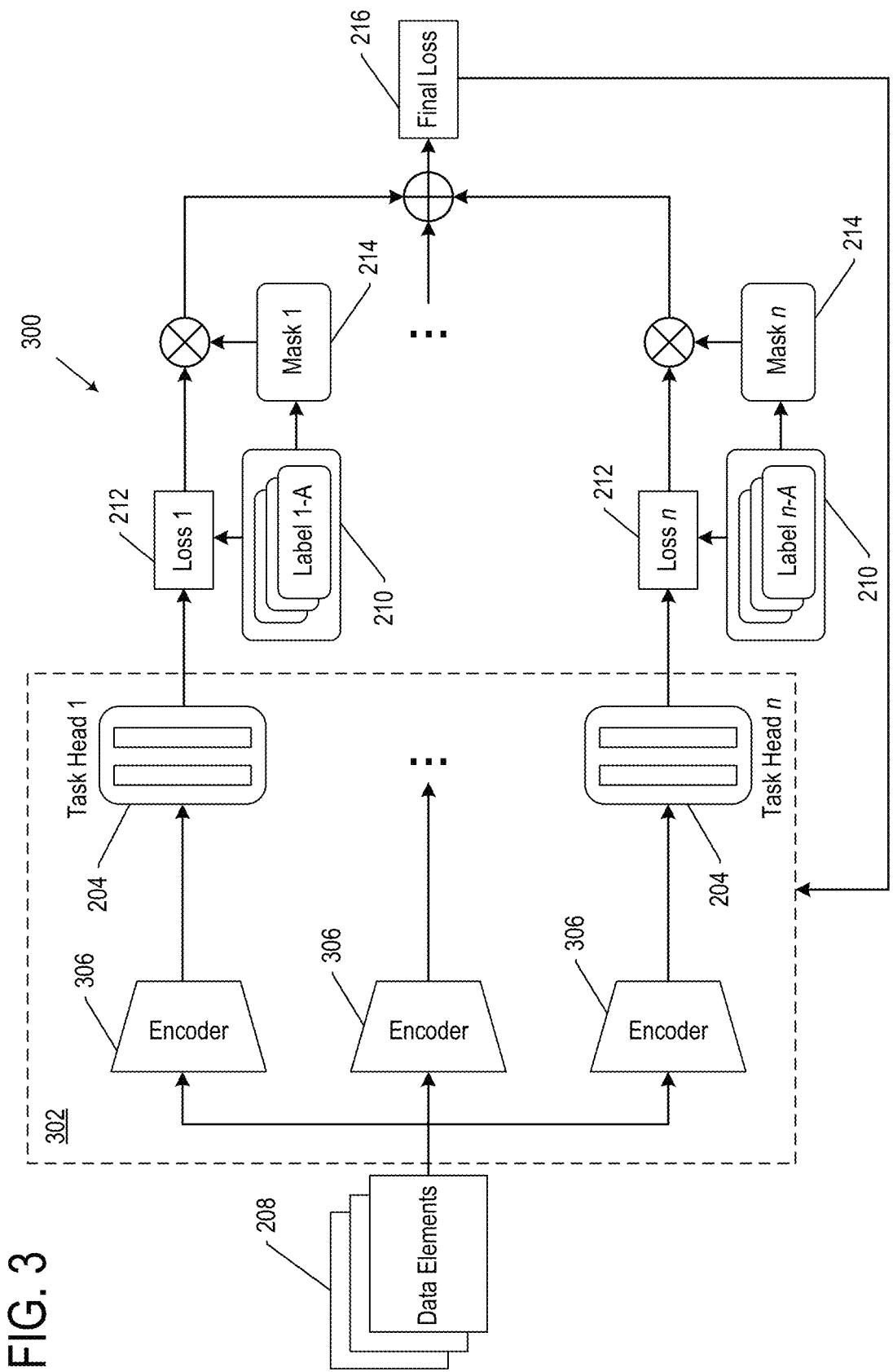
FIG. 3 is a diagram conceptually illustrating an example configurable framework for multi-task joint training of neural networks utilizing multiple encoders in accordance with an implementation of the present disclosure, which can be implemented by the system of FIG. 1.

Different neural network architectures can be implemented for multi-task joint training processes. For example, the encoder module can be shared by each task head. In other implementations, each task head is in communication with a separate encoder. FIGS. 2 and 3 illustrate different neural network architectures for implementing multi-task joint training processes. FIG. 2 is a diagram conceptually illustrating an example configurable framework 200 for multi-task joint training of neural networks utilizing a shared encoder in accordance with an implementation of the present disclosure, which can be implemented using the example system of FIG. 1 or other suitable hardware and software. As shown, the framework 200 includes a neural network 202 that further includes a plurality of task heads 204 and a shared encoder 206. The shared encoder 206 receives data elements 208 as inputs and extracts features from them. Different types of data elements 208 such as image data, audio data, natural language processing data, graph data, etc. can be utilized. The plurality of task heads 204 then receives the extracted features as inputs. Task heads can be implemented using a variety of different neural network architectures. In some implementations, a task head is implemented using fully connected neural network layers designed for generating predictions related to an inference task. Different task heads for performing different types of inference tasks can be implemented. Examples of inference task categories include classification, regression, clustering, ranking, detection, recommendation, etc. For each task head 204, there can be an associated set of labels 210 used to compute training losses 212 for the particular task head. As shown in the framework 200, the training process and computations of training losses 212 can occur in parallel between or among the plurality of task heads 204. The sets of labels 210 can include incomplete annotations, such is typically the case when a diverse and/or mixed source dataset is used. To compensate for missing annotations, a mask 214 can be used to filter the training loss 212. A mask 214 can be generated based on an associated set of labels 210. Separate masks 214 can be generated for each set of labels 210. The filtered training losses from each task head 204 are then combined to compute a final loss metric 216, which can be used to update and/or modify the neural network 202 during the training process.

FIG. 3 is a diagram conceptually illustrating an example configurable framework 300 for multi-task joint training of neural networks utilizing multiple encoders in accordance with an implementation of the present disclosure, which can be implemented using the example system of FIG. 1 or other suitable hardware and software. As shown, the framework 300 includes a neural network 302 that further includes a plurality of task heads 204. Each task head 204 is associated with a separate encoder 306. Separate encoders 306 can be configured to extract features targeted for their respective task head 204. Task heads 204 performing different inference tasks can receive features different from one another. The remaining components and processes of framework 300 can be implemented similarly to that of the framework 200 as described and shown in FIG. 2.

Figure 4:
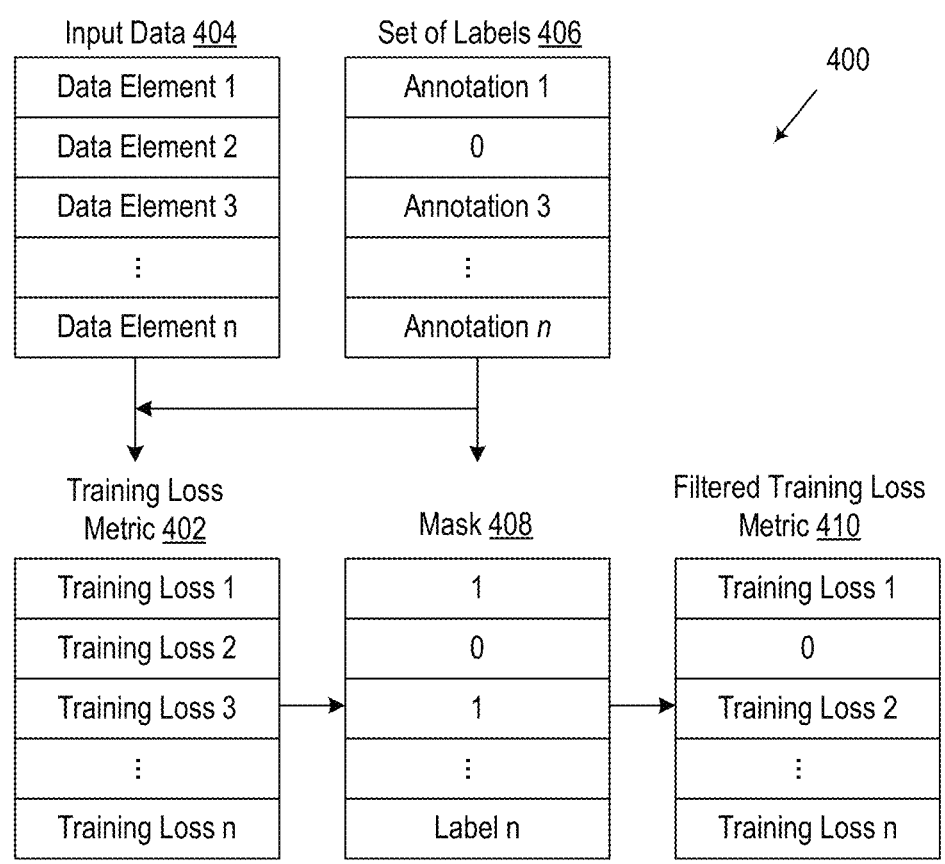
FIG. 4 is a diagram conceptually illustrating an example process for applying a binary mask to a computed training loss, which can be implemented by the system of FIG. 1.

In addition to different neural network architectures, multi-task joint training methods can include different implementations of the filtering and masking processes. FIG. 4 is a diagram conceptually illustrating an example process 400 for applying a binary mask to a computed training loss in accordance with an implementation of the present disclosure. As shown, a training loss metric 402 is computed using input data 404 and an associated set of labels 406 for a given task. The training loss metric 402 can be computed by comparing prediction outputs from a task head with the associated set of labels 406. Different functions may be used to calculate the training loss metric. In some implementations, training loss metric 402 is computed using a smooth L1 loss function. The input data 404 includes n data elements, and the set of labels 406 includes n annotations. In the illustrative example, the set of labels 406 is missing at least an annotation associated with the $2^{nd}$ data element of the input data 404. A mask 408 is computed using the set of labels 406. Different types of masks can be used depending on the application. In the example process 400, the mask 408 is a binary mask. Computation of the mask 408 can be based on how missing annotations are represented in the set of labels 406. In some implementations, the set of labels 406 include random values for missing annotations. Different data representation schemes can be utilized, and the masking process can be modified as appropriate. For example, in the diagram of FIG. 4, the set of labels 406 is zero-padded, having values of zeroes for missing annotations. As such, the set of labels 406 includes a zero value representing the missing annotation for the $2^{nd}$ data element of the input data 404. In such cases, a binary mask can be computed by passing on the zero-values representing missing annotations. Using the mask 408, the training metric 402 can be filtered to remove training losses resulting from missing annotations. The resulting filtered training loss metric 410 includes training losses for data elements having applicable annotations.

Multi-task head joint training frameworks can implement multiple task heads configured to perform different types of inference tasks. For example, a first task head can be configured to perform a classification task, and a second task head can be configured to perform a regression task. Additional task heads and other types of inference tasks can also be implemented depending on the application. The task heads can be configured to perform different tasks that are correlated with one another. In some implementations, the first task head can be configured to perform a classification task that includes a facial expression capturing task, and the second task head can be configured to perform a regression task that includes a facial landmark regression task. Facial expression capturing tasks and facial landmark regression tasks can both utilize facial image data as inputs, which will likely result in commonalities between the two tasks during the training process. As such, a diverse dataset in combination with the use of multiple task heads would enable a joint training process performed in parallel that is more efficient and accurate than the training of single-label classification neural networks.

Figure 5:
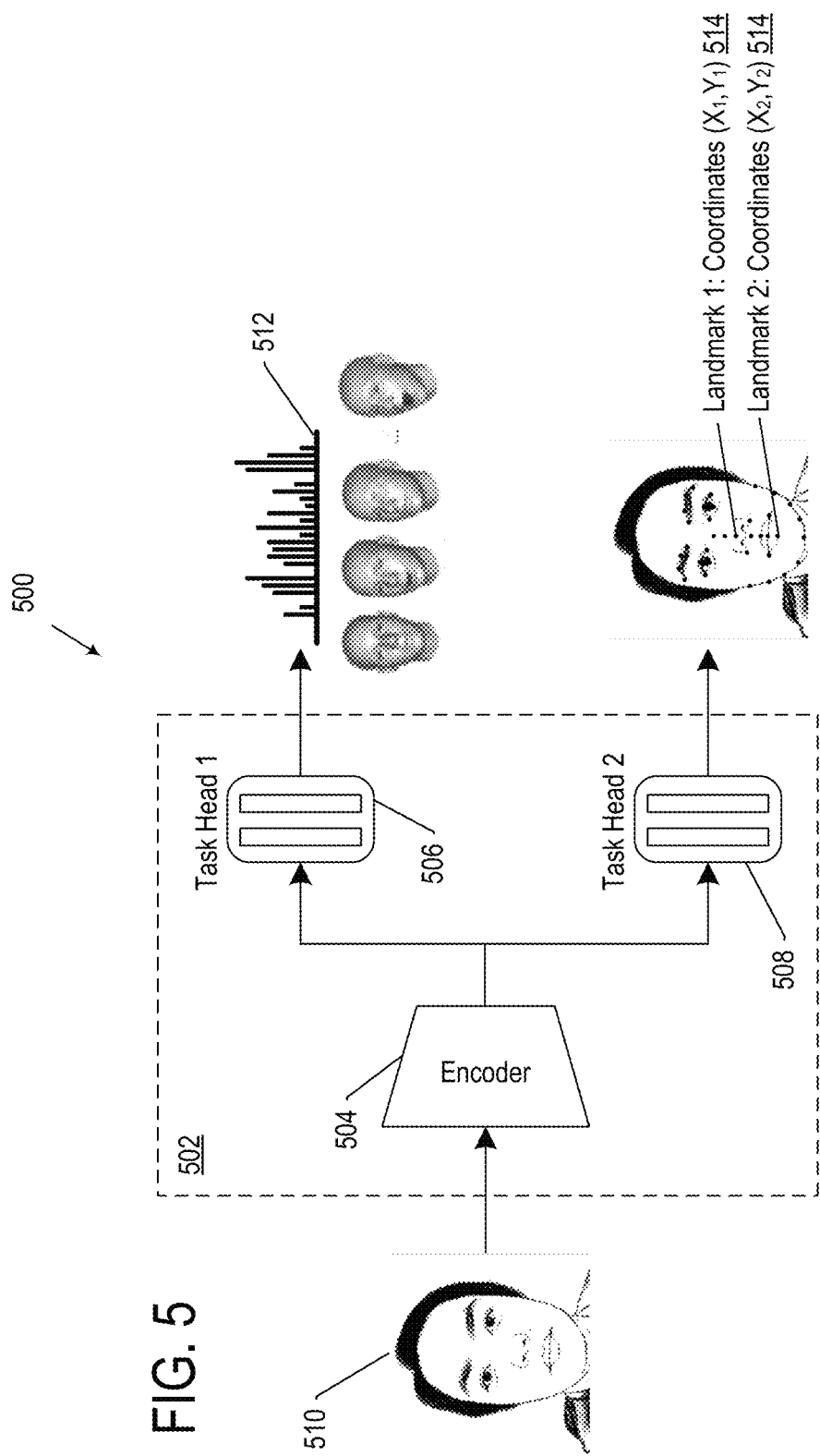
FIG. 5 is a diagram conceptually illustrating an example process for performing multiple inference tasks in accordance with an implementation of the present disclosure, which can be implemented by the system of FIG. 1.

FIG. 5 is a diagram conceptually illustrating an example process 500 for performing multiple inference tasks in accordance with an implementation of the present disclosure. As shown, the multi-task process 500 includes the use of a neural network 502 including a shared encoder 504 in communication with two task heads 506, 508. In the depicted process 500, the first task head 506 is configured to perform a facial expression capturing task, and the second task head 508 is configured to perform a facial landmark regression task. The input data 510 includes facial image data. The encoder 504 is implemented to extract features from the input data 510. The two task heads 506, 508 receive the extracted features as inputs and compute predictions based on their respective inference task. For example, the first task head 506 computes predicted weights 512 for combining blendshapes for classifying different expressions. The second task head 508 computes predicted facial landmarks and their coordinates. Other inference tasks can result in different types of outputted predictions. For example, in some implementations, a task head is configured to compute predictions indicating coordinates for a specific facial landmark. In other implementations, a task head is configured to compute predictions that classify the type of facial landmarks along with predicted coordinates of said landmarks.

As described above, the joint training process of related tasks can result in a synergistic effect that result in a better trained neural network compared to single-label classification neural networks. FIG. 6 is a chart showing error reduction values for a trained multi-task neural network compared to a baseline model for facial expression capturing classification tasks, illustrating results obtained by the example system of FIG. 1. As shown, the difference in the average L1 losses for a trained multi-task neural network and a baseline model (trained single-label classification neural network) is reported as a percentage. L1 losses for the two models were computed over a number of datasets (n=16) for twenty different predetermined categories of facial expressions. FIGS. 7A and 7B are charts comparing L1 losses for a multi-task joint trained neural network and a baseline model for facial expression capturing classification tasks, illustrating results obtained by the example system of FIG. 1. Values shown for each facial expression category are the averages of sixteen datasets.

As shown in FIGS. 6, 7A, and 7B, multi-task neural networks that are trained using diverse datasets for related tasks, such as facial expression capturing and facial landmark regression, perform better than the standard trained single-label classification neural network. Other multi-task head configurations can be implemented. For example, task heads for performing inference tasks related to a human's skeletal structure, such as pose and skeletal landmarks, can be implemented. Various other object detection and computer vision problems can also be implemented as appropriate depending on the application.

Figure 8:
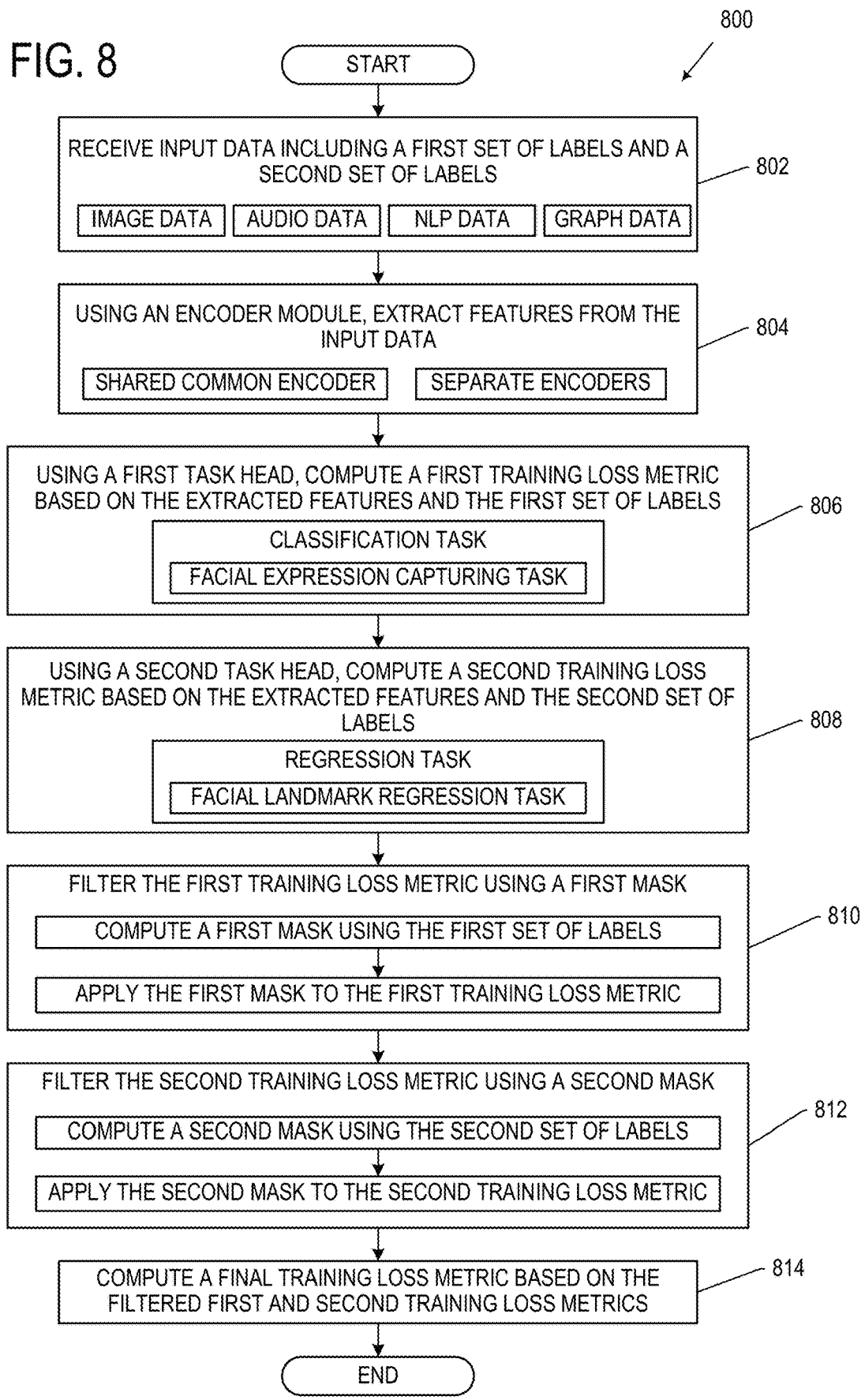
FIG. 8 is a flowchart conceptually illustrating an example method for multi-task joint training of neural networks in accordance with an implementation of the present disclosure, which can be implemented using the example system of FIG. 1 or other suitable hardware and software.

The systems and frameworks described in the sections above can be implemented using different processes, steps, and their variants. FIG. 8 is a flowchart conceptually illustrating an example method 800 for multi-task joint training of neural networks in accordance with an implementation of the present disclosure, which can be implemented using the example system of FIG. 1 or other suitable hardware and software. At step 802, the method includes receiving input data including a first set of labels and a second set of labels. In some implementations, the input data includes image data. In further implementations, the image data includes an image associated with a first label from the first set of labels and a second label from the second set of labels, where the first label indicates a facial expression and the second label indicates a missing annotation. Different types and formats of input data can be utilized. Examples include image data, audio data, natural language processing data, graph data, etc. The sets of labels can include task-specific annotations relating to the input data. In some implementations, the input data includes more than two sets of labels. In some implementations, at least one of the sets of labels includes annotations for a portion of the input data and missing annotations for the remaining portion of the input data. At step 804, the method includes extracting features from the input data using an encoder module. In some implementations, the encoder module is implemented using a single encoder neural network. In other embodiments, the encoder module is implemented using multiple encoder neural networks. The encoder module can also be implemented using different types of network models, such as a convolutional neural network, a recurrent neural network, a transformer, or a sub-network. At step 806, the method includes computing, using a first task head, a first training loss metric based on the extracted features and the first set of labels. At step 808, the method includes computing, using a second task head, a second training loss metric based on the extracted features and the second set of labels. The task heads can be configured to perform different types of inference tasks. In some implementations, the first task head can be configured to perform a classification task, and the second task head can be configured to perform a regression task. In further implementations, the first task head can be configured to perform a facial expression capturing task, and the second task head can be configured to perform a facial landmark regression task. The facial expression capturing task can include computing a prediction indicating a facial expression that is one of a predetermined number of facial expression categories. In such implementations, the first training loss metric is computed by comparing the first set of labels with the prediction indicating the facial expression. The facial landmark regression task can include computing a prediction indicating coordinates of a facial landmark. In such implementations, the second training loss metric is computed by comparing the second set of labels with the prediction indicating the coordinates of the facial landmark. Task heads for performing other types of inference tasks, such as clustering, ranking, detection, and recommendation tasks, can be implemented depending on the application.

At step 810, the method includes filtering the first training loss metric using a first mask. The first mask may be computed using the first set of labels, which can then be applied to the first training loss metric to filter undesired training losses. At step 812, the method includes filtering the second training loss metric using a second mask. The second mask may be computed using the second set of labels, which can then be applied to the second training loss metric to filter undesired training losses. In some implementations, at least one of the masks includes a binary mask having zero values corresponding to the missing annotations of the first set of labels. As At step 814, the method includes computing a final training loss metric based on the filtered first and second training loss metrics. The final training loss metric can be used to update and adjust the neural network including the encoder and plurality of task heads. Once the neural network is trained, it can be deployed for specific applications. Deployment of the trained neural network may include implementing the neural network in an external system for use in another application.

While FIG. 8 illustrates a method 800 for multi-task joint training of neural networks generally, it will be appreciated certain variations are possible. Within each step, many different implementations and configurations exist. In some implementations, the method includes the use of input data having more than two sets of labels. In such implementations, the method can further include the use of more than two task heads. For example, the method can be implemented to utilize input data having three sets of labels. A first training loss metric can be computed based on a first set of labels using a first task head, a second training loss metric can be computed based on a second set of labels using a second task head, and a third training loss metric can be computed based on a third set of labels using a third task head. Higher numbers of task heads can also be implemented. The task heads can include neural network architectures for partially or completely differing types of inference tasks. Furthermore, the steps as described in process 800 can occur sequentially or in parallel, or in a different order, provided similar functionality is achieved. For example, steps 806 and 808 can be performed in parallel, where the two task heads are computing their respective training loss metrics in parallel. Similarly, steps 810 and 812 can be performed in parallel.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
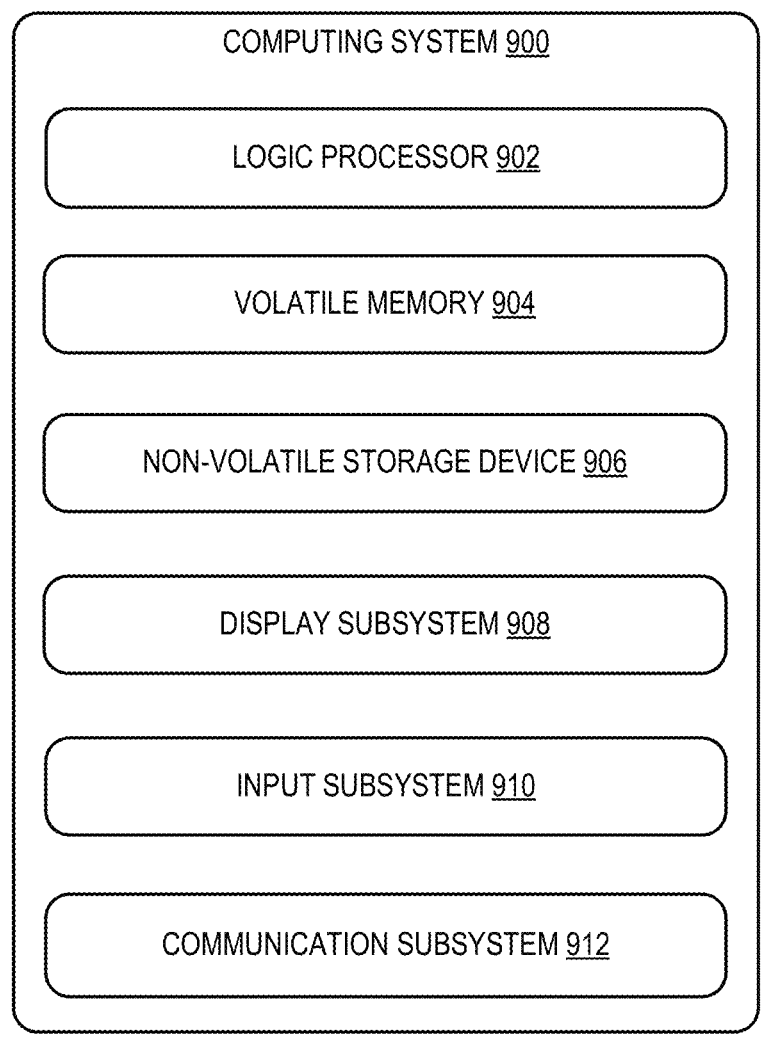
FIG. 9 illustrates an example computer environment that may be utilized to implement the example system of FIG. 1.

FIG. 9 schematically shows a non-limiting embodiment of a computing system 900 that can enact one or more of the methods and processes described above. Computing system 900 is shown in simplified form. Computing system 900 may embody the computing system 100 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display sub system 908, input sub system 910, communication sub system 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computer system for multi-task joint training of a neural network including an encoder module and a multi-headed attention mechanism, the computer system comprising a processor coupled to a storage medium that stores instructions, which, upon execution by the processor, cause the processor to receive input data including a first set of labels and a second set of labels; using the encoder module, extract features from the input data; using a first task head of the multi-headed attention mechanism, compute a first training loss metric using the extracted features and the first set of labels; using a second task head of the multi-headed attention mechanism, compute a second training loss metric using the extracted features and the second set of labels; apply a first mask to filter the first training loss metric, wherein the first mask is computed based on the first set of labels; apply a second mask to filter the second training loss metric, wherein the second mask is computed based on the second set of labels; and compute a final training loss metric based on the filtered first training loss metric and the filtered second training loss metric. In this aspect, additionally or alternatively, the first task head includes a classification neural network model. In this aspect, additionally or alternatively, the classification neural network model includes a facial expression capturing neural network model configured to compute, using the extracted features, a prediction indicating a facial expression that is one of a predetermined number of facial expression categories, wherein the first training loss metric is computed by comparing the first set of labels with the prediction indicating the facial expression. In this aspect, additionally or alternatively, the second task head includes a regression neural network model. In this aspect, additionally or alternatively, the regression neural network model includes a facial landmark regression model configured to compute, using the extracted features, a prediction indicating coordinates of a facial landmark, wherein the second training loss metric is computed by comparing the second set of labels with the prediction indicating the coordinates of the facial landmark. In this aspect, additionally or alternatively, the first set of labels includes annotations for a portion of the input data and missing annotations for the remaining portion of the input data. In this aspect, additionally or alternatively, the first mask includes a binary mask having zero values corresponding to the missing annotations of the first set of labels. In this aspect, additionally or alternatively, the input data includes image data. In this aspect, additionally or alternatively, the image data includes an image associated with a first label from the first set of labels, the first label indicating a facial expression; and a second label from the second set of labels, the second label indicates a missing annotation. In this aspect, additionally or alternatively, the encoder module includes one or more of a convolutional neural network, a recurrent neural network, a transformer, or a sub-network.

Another aspect provides a method for performing an inference task using a neural network, the method comprising providing the neural network; receive an image; and compute a result by processing the image using the neural network, wherein the neural network has been trained by receiving input data including a first set of labels and a second set of labels; using an encoder module, extracting features from the input data; using a first task head of a multi-headed attention mechanism, computing a first training loss metric using the extracted features and the first set of labels; using a second task head of the multi-headed attention mechanism, computing a second training loss metric using the extracted features and the second set of labels; applying a first mask to filter the first training loss metric, wherein the first mask is computed based on the first set of labels; applying a second mask to filter the second training loss metric, wherein the second mask is computed based on the second set of labels; computing a final training loss metric based on the filtered first training loss metric and the filtered second training loss metric; and updating the neural network based on the final training loss metric. In this aspect, additionally or alternatively, the first task head includes a classification neural network model. In this aspect, additionally or alternatively, the classification neural network model includes a facial expression capturing neural network model configured to compute, using the extracted features, a prediction indicating a facial expression that is one of a predetermined number of facial expression categories, wherein the first training loss metric is computed by comparing the first set of labels with the prediction indicating the facial expression. In this aspect, additionally or alternatively, the second task head includes a regression neural network model. In this aspect, additionally or alternatively, the regression neural network model includes a facial landmark regression model configured to compute, using the extracted features, a prediction indicating coordinates of a facial landmark, wherein the second training loss metric is computed by comparing the second set of labels with the prediction indicating the coordinates of the facial landmark. In this aspect, additionally or alternatively, the first set of labels includes annotations for a portion of the input data and missing annotations for the remaining portion of the input data. In this aspect, additionally or alternatively, the first mask includes a binary mask having zero values corresponding to the missing annotations of the first set of labels. In this aspect, additionally or alternatively, the input data includes image data. In this aspect, additionally or alternatively, the image data includes an image associated with a first image label from the first set of labels, the first image label indicating a facial expression; and a second image label from the second set of labels, the second image label indicates a missing annotation.

Another aspect provides a computer system for multi-task joint training of a neural network including an encoder module and a multi-headed attention mechanism, the computer system comprising a processor coupled to a storage medium that stores instructions, which, upon execution by the processor, cause the processor to receive image data including a set of facial expression labels and a set of facial landmark labels; using the encoder module, extract features from the image data; using a facial expression classification task head of the multi-headed attention mechanism, compute a first training loss metric using the extracted features and the set of facial expression labels; using a facial landmark regression task head of the multi-headed attention mechanism, compute a second training loss metric using the extracted features and the set of facial landmark labels; apply a first mask to filter the first training loss metric, wherein the first mask is computed based on the set of facial expression labels; apply a second mask to filter the second training loss metric, wherein the second mask is computed based on the set of facial landmark labels; and compute a final training loss metric based on the filtered first training loss metric and the filtered second training loss metric.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system for multi-task joint training of a neural network including an encoder module and a multi-headed attention mechanism, the computer system comprising:
  a processor coupled to a storage medium that stores instructions, which, upon execution by the processor, cause the processor to:
    receive input data including a first set of labels and a second set of labels;
    using the encoder module, extract features from the input data;
    using a first task head of the multi-headed attention mechanism, compute a first training loss metric using the extracted features and the first set of labels;
    using a second task head of the multi-headed attention mechanism, compute a second training loss metric using the extracted features and the second set of labels;
    apply a first mask to filter the first training loss metric, wherein the first mask is computed based on the first set of labels;
    apply a second mask to filter the second training loss metric, wherein the second mask is computed based on the second set of labels; and
    compute a final training loss metric based on the filtered first training loss metric and the filtered second training loss metric.

2. The computer system of claim 1, wherein the first task head includes a classification neural network model.

3. The computer system of claim 2, wherein the classification neural network model includes a facial expression capturing neural network model configured to compute, using the extracted features, a prediction indicating a facial expression that is one of a predetermined number of facial expression categories, wherein the first training loss metric is computed by comparing the first set of labels with the prediction indicating the facial expression.

4. The computer system of claim 1, wherein the second task head includes a regression neural network model.

5. The computer system of claim 4, wherein the regression neural network model includes a facial landmark regression model configured to compute, using the extracted features, a prediction indicating coordinates of a facial landmark, wherein the second training loss metric is computed by comparing the second set of labels with the prediction indicating the coordinates of the facial landmark.

6. The computer system of claim 1, wherein the first set of labels includes annotations for a portion of the input data and missing annotations for the remaining portion of the input data.

7. The computer system of claim 6, wherein the first mask includes a binary mask having zero values corresponding to the missing annotations of the first set of labels.

8. The computer system of claim 1, wherein the input data includes image data.

9. The computer system of claim 8, wherein the image data includes an image associated with:

a first label from the first set of labels, the first label indicating a facial expression; and a second label from the second set of labels, the second label indicates a missing annotation.

10. The computer system of claim 1, wherein the encoder module includes one or more of a convolutional neural network, a recurrent neural network, a transformer, or a sub-network.

11. A method for performing an inference task using a neural network, the method comprising:

providing the neural network;

receive an image; and compute a result by processing the image using the neural network, wherein the neural network has been trained by:

receiving input data including a first set of labels and a second set of labels;

using an encoder module, extracting features from the input data;

using a first task head of a multi-headed attention mechanism, computing a first training loss metric using the extracted features and the first set of labels;

using a second task head of the multi-headed attention mechanism, computing a second training loss metric using the extracted features and the second set of labels;

applying a first mask to filter the first training loss metric, wherein the first mask is computed based on the first set of labels;

applying a second mask to filter the second training loss metric, wherein the second mask is computed based on the second set of labels;

computing a final training loss metric based on the filtered first training loss metric and the filtered second training loss metric; and updating the neural network based on the final training loss metric.

12. The method of claim 11, wherein the first task head includes a classification neural network model.

13. The method of claim 12, wherein the classification neural network model includes a facial expression capturing neural network model configured to compute, using the extracted features, a prediction indicating a facial expression that is one of a predetermined number of facial expression categories, wherein the first training loss metric is computed by comparing the first set of labels with the prediction indicating the facial expression.

14. The method of claim 11, wherein the second task head includes a regression neural network model.

15. The method of claim 14, wherein the regression neural network model includes a facial landmark regression model configured to compute, using the extracted features, a prediction indicating coordinates of a facial landmark, wherein the second training loss metric is computed by comparing the second set of labels with the prediction indicating the coordinates of the facial landmark.

16. The method of claim 11, wherein the first set of labels includes annotations for a portion of the input data and missing annotations for the remaining portion of the input data.

17. The method of claim 16, wherein the first mask includes a binary mask having zero values corresponding to the missing annotations of the first set of labels.

18. The method of claim 11, wherein the input data includes image data.

19. The method of claim 18, wherein the image data includes an image associated with:

a first image label from the first set of labels, the first image label indicating a facial expression; and a second image label from the second set of labels, the second image label indicates a missing annotation.

20. A computer system for multi-task joint training of a neural network including an encoder module and a multi-headed attention mechanism, the computer system comprising:

a processor coupled to a storage medium that stores instructions, which, upon execution by the processor, cause the processor to:

receive image data including a set of facial expression labels and a set of facial landmark labels;

using the encoder module, extract features from the image data;

using a facial expression classification task head of the multi-headed attention mechanism, compute a first training loss metric using the extracted features and the set of facial expression labels;

using a facial landmark regression task head of the multi-headed attention mechanism, compute a second training loss metric using the extracted features and the set of facial landmark labels;

apply a first mask to filter the first training loss metric, wherein the first mask is computed based on the set of facial expression labels;

apply a second mask to filter the second training loss metric, wherein the second mask is computed based on the set of facial landmark labels; and compute a final training loss metric based on the filtered first training loss metric and the filtered second training loss metric.

* * * * *